United States Patent
Koda et al.

(10) Patent No.: US 12,005,934 B2
(45) Date of Patent: Jun. 11, 2024

(54) AUTONOMOUS DRIVING ASSISTANCE DEVICE

(71) Applicants: PIONEER CORPORATION, Tokyo (JP); GEOTECHNOLOGIES, INC., Tokyo (JP)

(72) Inventors: Takeshi Koda, Kawagoe (JP); Kenji Mito, Kawagoe (JP); Kazuhiro Nakao, Kawasaki (JP); Makoto Hatano, Kawagoe (JP)

(73) Assignees: PIONEER CORPORATION, Tokyo (JP); GEOTECHNOLOGIES, INC., Tokyo (JP)

( * ) Notice: Subject to any disclaimer, the term of this patent is extended or adjusted under 35 U.S.C. 154(b) by 5 days.

(21) Appl. No.: 17/183,781

(22) Filed: Feb. 24, 2021

(65) Prior Publication Data

US 2021/0200216 A1   Jul. 1, 2021

Related U.S. Application Data

(62) Division of application No. 15/560,525, filed as application No. PCT/JP2016/059036 on Mar. 22, 2016, now Pat. No. 10,942,517.

(51) Int. Cl.
*G05D 1/00* (2006.01)
*B60W 50/08* (2020.01)
(Continued)

(52) U.S. Cl.
CPC ...... *B60W 60/0059* (2020.02); *B60W 50/082* (2013.01); *G01C 21/3461* (2013.01);
(Continued)

(58) Field of Classification Search
CPC .......... G05D 1/0088; B60W 50/082; B60W 2540/043; B60W 2556/50;
(Continued)

(56) References Cited

U.S. PATENT DOCUMENTS

| | | | |
|---|---|---|---|
| 7,031,829 B2 | 4/2006 | Nisiyama | |
| 2004/0068366 A1 | 4/2004 | Nisiyama | |
| 2011/0118939 A1 | 5/2011 | Kawamata et al. | |
| 2017/0010613 A1 | 1/2017 | Fukumoto | |
| 2017/0227971 A1* | 8/2017 | Shimotani | G06V 20/588 |

FOREIGN PATENT DOCUMENTS

| | | | |
|---|---|---|---|
| CN | 1497242 A | 5/2004 | |
| CN | 102067052 A | 5/2011 | |
| (Continued) | | | |

OTHER PUBLICATIONS

International Search Report dated Jun. 14, 2016 in corresponding International Application No. PCT/JP2016/059036 with English translation of International Search Report.
(Continued)

*Primary Examiner* — Michael V Kerrigan
(74) *Attorney, Agent, or Firm* — NIXON & VANDERHYE

(57) ABSTRACT

A driving assistance device performs autonomous driving based on an output from a sensor unit that acquires information on surroundings of a vehicle or information on the state of the vehicle. The driving assistance device stores an autonomous driving determination table based on autonomous driving compatibility information. By referring to the autonomous driving determination table based on sensor information on the sensor unit and road element information on a predetermined road section, the driving assistance device 1 determines a set of an autonomous driving function and an automation level that can be performed in the predetermined road section.

7 Claims, 7 Drawing Sheets

(51) Int. Cl.
*B60W 60/00* (2020.01)
*G01C 21/34* (2006.01)
*G08G 1/0968* (2006.01)

(52) U.S. Cl.
CPC . *G08G 1/096827* (2013.01); *G08G 1/096838* (2013.01); *G08G 1/09685* (2013.01); *G08G 1/096866* (2013.01); *B60W 2540/043* (2020.02); *B60W 2555/20* (2020.02); *B60W 2556/50* (2020.02); *B60W 2556/65* (2020.02)

(58) Field of Classification Search
CPC ......... B60W 2556/65; B60W 60/0011; B60W 40/02; B60W 40/06; B60W 50/00; B60W 2050/0001; G01C 21/3461; G08G 1/096827; G08G 1/096838; G08G 1/09685; G08G 1/096866; G08G 1/096725; G08G 1/096833; G08G 1/0969
See application file for complete search history.

(56) References Cited

FOREIGN PATENT DOCUMENTS

| | | |
|---|---|---|
| JP | 2004-125726 A | 4/2004 |
| JP | 2005145396 A | 6/2005 |
| JP | 2010-949 A | 1/2010 |
| JP | 2014-66636 A | 4/2014 |
| JP | 2014-93018 A | 5/2014 |
| WO | 2009-153661 A1 | 12/2009 |
| WO | WO-2009153661 A1 * 12/2009 ............ B60W 10/06 |  |

OTHER PUBLICATIONS

Extended European Search Report for Application No. 16768776.3, dated Nov. 7, 2018.

* cited by examiner

| PRESENT POSITION INFORMATION | ROAD SECTION INFORMATION | LANE INFORMATION | ... |
|---|---|---|---|

| ROAD SECTION INFORMATION | LANE INFORMATION | ROAD ELEMENT INFORMATION Ie | ROAD ATTRIBUTE INFORMATION | ... |
|---|---|---|---|---|

| CATEGORY | SUBCATEGORY | PRESENCE /ABSENCE | ATTRIBUTE INFORMATION |
|---|---|---|---|
| PAINT INFORMATION (WHITE LINE, YELLOW LINE,...) | CENTER LINE | ✓ | COLOR, LINE TYPE, WIDTH... |
|  | ROAD SHOULDER LINE | ✓ | COLOR, LINE TYPE, WIDTH... |
|  | CHARACTER, FIGURE, ARROW |  |  |
|  | CROSSWALK |  |  |
| LANE INFORMATION | NUMBER OF LANES | ✓ |  |
|  | TURN LANE INFORMATION |  |  |
|  | DIVERGING LANE INFORMATION |  | RIGHTWARD, LEFTWARD |
|  | MERGING LANE INFORMATION |  | MERGING TO LEFT, MERGING TO RIGHT, MERGING FROM LEFT, MERGING FROM RIGHT |
|  | PRIORITY LANE INFORMATION |  | BICYCLE, BUS, CARPOOL |
|  | TRANSIT DIVISION INFORMATION |  | TRUCK |
|  | PRIORITY LANE FOR AUTONOMOUS DRIVING VEHICLE |  |  |
| LANDMARK INFORMATION | UTILITY POLE | ✓ | POSITION, HEIGHT, DIAMETER, INTERVAL |
|  | GUARDRAIL |  | HEIGHT, COLOR |
|  | ROAD SIGN | ✓ | TYPE |
|  | TRAFFIC LIGHT |  | DIRECTION : HORIZONTAL OR VERTICAL |

| AUTONOMOUS DRIVING FUNCTION | AUTOMATION LEVEL | COMPATIBILITY WITH THE MODEL | REQUIRED SENSOR | APPLICABLE CONDITION |
|---|---|---|---|---|
| FUNCTION α | 1ST LEVEL | ○ | CAMERA | A |
| | 2ND LEVEL | ○ | CAMERA+LIDAR | A+B |
| | 3RD LEVEL | ○ | CAMERA+LIDAR | A+B+C |
| FUNCTION β | 1ST LEVEL | × | — | A+D |
| | 2ND LEVEL | ○ | CAMERA+LIDAR | A+C+D |

| ROAD SECTION | LANE | ROAD ELEMENT INFORMATION | ... |
|---|---|---|---|
| ROAD SECTION # | 1ST LANE | A:○ B:○ C:× D:○ | ... |
| | 2ND LANE | A:○ B:× C:× D:○ | ... |
| ... | ... | ... | ... |

AUTONOMOUS DRIVING ASSISTANCE DEVICE

CROSS-REFERENCE TO RELATED APPLICATION

This application is a divisional of U.S. patent application Ser. No. 15/560,525 filed on Sep. 22, 2017, which is the national phase of PCT International Application No. PCT/JP2016/059036 filed on Mar. 22, 2016, which claims priority to PCT International Application No. PCT/JP2015/058881 filed on Mar. 24, 2015, the contents of which are hereby incorporated by reference.

TECHNICAL FIELD

The present invention relates to a technology for autonomous driving.

BACKGROUND TECHNIQUE

Conventionally, there is known so-called autonomous driving which automatically controls the driving of a vehicle. At the time of performing autonomous driving, for example, it is necessary to recognize peripheral information on the own vehicle such as a compartment line and a vehicle in front by using external sensors such as a camera and recognize the state (including posture) of the vehicle by using internal sensors such as an acceleration sensor and a gyroscope sensor. Patent Reference-1 discloses a technique for recognizing the traveling lane and a static landmark based on images from a camera mounted on a vehicle.

Patent Reference-1: Japanese Patent Application Laid-open under No. 2014-093018

DISCLOSURE OF INVENTION

Problem to be Solved by the Invention

Even if a vehicle itself is equipped with sensors for autonomous driving, autonomous driving with the sensors cannot be performed in such a place that there is no "object" to be recognized by the sensors or in such a situation that the object cannot be detected by the sensors. For example, in such a road section that there is no compartment line, autonomous driving which controls a vehicle by using information on a compartment line cannot be performed. Additionally, required type and performance of sensors depend on the function and its level of autonomous driving. Thus, a feasible function and its level of autonomous driving differ per vehicle. Patent Reference-1 fails to disclose above-mentioned issues.

The above is an example of the problem to be solved by the present invention. An object of the present invention is to provide an autonomous driving assistance device capable of suitably determining the feasible function and its level of autonomous driving.

Means for Solving the Problem

One invention is an autonomous driving assistance device including: a first acquisition unit configured to acquire or store first information on a peripheral information acquisition unit, the peripheral information acquisition unit acquiring information on surroundings of a vehicle or a state of the vehicle; a second acquisition unit configured to acquire second information on a road in a predetermined section; and a determination unit configured to determine a level, at which the vehicle can perform autonomous driving in the predetermined section, with respect to each function of the autonomous driving based on the first information and the second information.

Another invention is an autonomous driving assistance device including: a first acquisition unit configured to acquire or store first information on a type or a capability of a peripheral information acquisition unit, the peripheral information acquisition unit acquiring information on surroundings of a vehicle; a second acquisition unit configured to acquire second information on a road in a predetermined section; and a determination unit configured to determine, on a basis of the first information and the second information, a level of a function regarding autonomous driving which the vehicle can perform in the predetermined section.

Still another invention is an autonomous driving assistance device including: a first acquisition unit configured to acquire or store first information on a level of a function regarding autonomous driving which a vehicle can perform; a second acquisition unit configured to acquire second information on a road in a predetermined section; and a determination unit configured to determine a level, at which the vehicle can perform the autonomous driving in the predetermined section, with respect to each function regarding the autonomous driving based on the first information and the second information.

Still another invention is a control method executed by an autonomous driving assistance device, including a determination process to determine a level, at which a vehicle can perform autonomous driving in a predetermined section, with respect to each function regarding the autonomous driving based on first information and second information, the first information indicating information on a peripheral information acquisition unit which acquires information on surroundings of the vehicle or a state of the vehicle, the second information indicating information on a road in the predetermined section.

Still another invention is a program executed by a computer, making the computer function as: a determination unit configured to determine a level, at which a vehicle can perform autonomous driving in a predetermined section, with respect to each function regarding the autonomous driving based on first information and second information, the first information indicating information on a peripheral information acquisition unit which acquires information on surroundings of the vehicle or a state of the vehicle, the second information indicating information on a road in the predetermined section.

BRIEF DESCRIPTION OF THE DRAWINGS

FIGS. 3A to 3C indicate examples of the data structures of a road section conversion table and an autonomous driving data element table.

FIGS. 4A and 4B indicate examples of the data structures of an autonomous driving determination table and an autonomous driving data element.

DETAILED DESCRIPTION OF THE PREFERRED EMBODIMENTS

Figure 1:
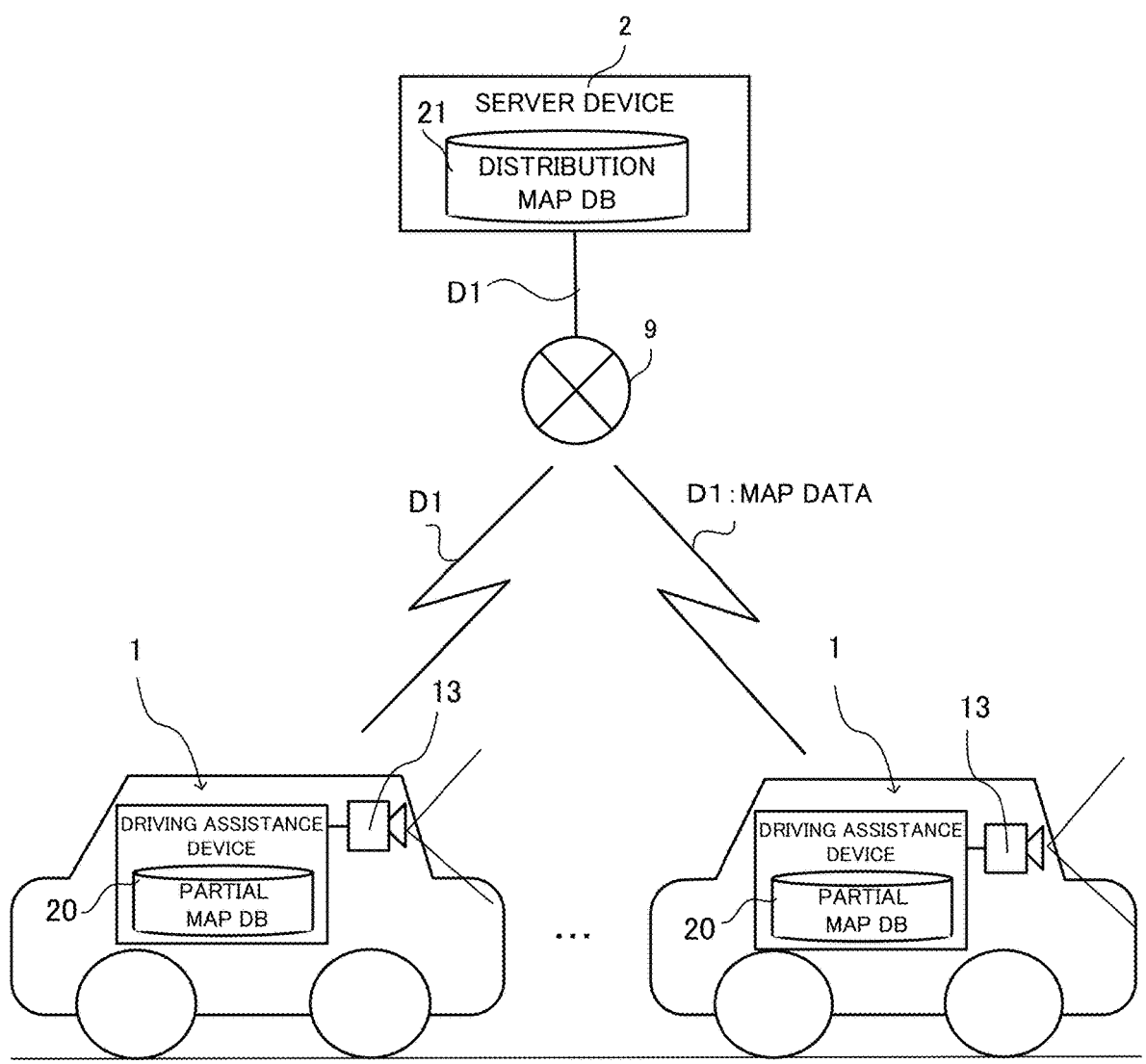
FIG. 1 illustrates a schematic configuration of an autonomous driving system.

According to a preferable embodiment of the present invention, there is provided an autonomous driving assistance device including: a first acquisition unit configured to acquire or store first information on a peripheral information acquisition unit, the peripheral information acquisition unit acquiring information on surroundings of a vehicle or a state of the vehicle; a second acquisition unit configured to acquire second information on a road in a predetermined section; and a determination unit configured to determine a level, at which the vehicle can perform autonomous driving in the predetermined section, with respect to each function of the autonomous driving based on the first information and the second information.

The term "autonomous driving" according to the present invention indicates not only "full autonomous driving", which does not need any driving operation of a driver under any circumstances, but also "temporal autonomous driving" which does not need a driving operation of a driver under a certain circumstances or conditions. The term "autonomous driving" also includes "partial autonomous driving" (drive assistance function) which automatically controls a part of driving (e.g., steering of vehicle), at the time of a driving operation of a driver being performed, for the purpose of reducing the burden on the driver and/or keeping the running safety of the vehicle. The autonomous driving assistance device according to this mode can suitably determine a level, at which the vehicle can perform autonomous driving in a predetermined section, with respect to each function of the autonomous driving based on the first information relating to the peripheral information acquisition unit and the second information relating to the road.

In one mode of the autonomous driving assistance device, the determination unit is configured to determine the level based on table information, the table information indicating a condition on the second information with respect to each level of the function. The autonomous driving assistance device according to this mode can precisely determine the level of the function of autonomous driving that is feasible in a predetermined section.

In another mode of the autonomous driving assistance device, the determination unit is configured to determine the level with respect to each function, which the vehicle can perform in the predetermined section, regarding the autonomous driving which has multiple functions. According to this mode, the autonomous driving assistance device can suitably determine the level of the function of autonomous driving that is feasible in a predetermined section from multiple functions of autonomous driving.

In still another mode of the autonomous driving assistance device, the autonomous driving assistance device further includes an autonomous driving control unit configured to perform autonomous driving of the vehicle based on peripheral information acquired by the peripheral information acquisition unit, wherein the second information is information on an object to be detected for autonomous driving by the peripheral information acquisition unit. Generally, autonomous driving cannot be performed on such a road that there is no object needed for autonomous driving. Thus, in this mode, the autonomous driving assistance device can suitably determine the level of the function of autonomous driving that is feasible in a predetermined section.

In still another mode of the autonomous driving assistance device, the autonomous driving assistance device further including an autonomous driving control unit configured to perform autonomous driving of the vehicle based on peripheral information acquired by the peripheral information acquisition unit, wherein the second acquisition unit is configured to acquire the second information on a section corresponding to a present position of the vehicle, and wherein the determination unit is configured to determine the level with respect to each function regarding autonomous driving in the section corresponding to the present position, and wherein the autonomous driving control unit is configured to determine, on a basis of a result determined by the determination unit, a function and its level to be performed regarding the autonomous driving. According to this mode, the autonomous driving assistance device can determine the level of the function of autonomous driving that is feasible in a section where the vehicle is traveling.

According to another preferable embodiment of the present invention, there is provided a first acquisition unit configured to acquire or store first information on a type or a capability of a peripheral information acquisition unit, the peripheral information acquisition unit acquiring information on surroundings of a vehicle; a second acquisition unit configured to acquire second information on a road in a predetermined section; and a determination unit configured to determine, on a basis of the first information and the second information, a level of a function of autonomous driving which the vehicle can perform in the predetermined section. Generally, a feasible function and its level of autonomous driving differ depending on the type and the capability of the peripheral information acquisition unit. Thus, according to this mode, on the basis of the first information and the second information, the autonomous driving assistance device can suitably determine the level of the function of autonomous driving that is feasible in a predetermined section.

In still another mode of the autonomous driving assistance device, the autonomous driving assistance device further includes a route search unit configured to search for candidates of a route to a destination specified through an external input, and a recommended route determination unit configured to select a recommended route from the candidates, wherein the second acquisition unit is configured to acquire the second information corresponding to each section included in the candidates, wherein the determination unit is configured to determine the level with respect to each section included in the candidates, and wherein the recommended route determination unit is configured to select the recommended route based on a result determined by the determination unit. According to this mode, the autonomous driving assistance device can suitably select the recommended route in consideration of the feasible level of each function of autonomous driving in each road section.

According to another preferable embodiment of the present invention, there is provided an autonomous driving assistance device including: a first acquisition unit configured to acquire or store first information on a level of a function of autonomous driving which a vehicle can perform; a second acquisition unit configured to acquire second information on a road in a predetermined section; and a determination unit configured to determine a level, at which the vehicle can perform autonomous driving in the predetermined section, with respect to each function of the autonomous driving based on the first information and the second information. According to the mode, in consideration of the level of the autonomous driving function which the vehicle can perform, the autonomous driving assistance device can determine a level, at which the vehicle can perform autonomous driving in the predetermined section, with respect to each function regarding the autonomous driving.

According to another preferable embodiment of the present invention, there is provided a control method executed by an autonomous driving assistance device, including a determination process to determine a level, at which a vehicle can perform autonomous driving in a predetermined section, with respect to each function regarding the autonomous driving based on first information and second information, the first information indicating information on a peripheral information acquisition unit which acquires information on surroundings of the vehicle or a state of the vehicle, the second information indicating information on a road in the predetermined section. By executing the control method, with respect to each function of autonomous driving, the autonomous driving assistance device can suitably determine the level at which the vehicle can perform autonomous driving in a predetermined section.

According to another preferable embodiment of the present invention, there is provided a program executed by a computer, making the computer function as a determination unit configured to determine a level, at which a vehicle can perform autonomous driving in a predetermined section, with respect to each function regarding the autonomous driving based on first information and second information, the first information indicating information on a peripheral information acquisition unit which acquires information on surroundings of the vehicle or a state of the vehicle, the second information indicating information on a road in the predetermined section. By executing the program, with respect to each function of autonomous driving, the computer can suitably determine the level at which the vehicle can perform autonomous driving in a predetermined section. Preferably, the program can be treated in a state that it is stored in a storage medium.

Embodiment

Now, a preferred embodiment of the present invention will be described below with reference to the attached drawings.

[Configuration of Autonomous Driving System]

FIG. 1 illustrates a schematic configuration of an autonomous driving system according to the embodiment. The autonomous driving system includes driving assistance devices 1 each of which moves together with a vehicle and a server device 2 which communicates with each of the driving assistance devices 1 via a network 9. According to the autonomous driving system, each driving assistance device 1 suitably conducts a route search in consideration of whether or not each function of autonomous driving can be performed and performs autonomous driving in accordance with the state of the road where the vehicle is traveling.

The driving assistance device 1 is a stationary navigation device or a portable phone such as a smart phone, and acquires map data "D1" corresponding to an area including present position of the vehicle from the distribution map DB 21 of the server device 2 to store it as the partial map DB 20. Then, on the basis of the received map data D1, the driving assistance device 1 searches for a route to the destination specified by the user and guides the user based on the specified route.

On the basis of outputs of a sensor unit 13 including a camera, the driving assistance device 1 performs autonomous driving in which whole or a part of driving operations is automated or semi-automated. The driving assistance device 1 determines whether or not autonomous driving can be performed with respect to each driving function to be automated (referred to as "autonomous driving function Fc"). Levels (each referred to as "automation level Lv") in accordance with the degree of automation are defined with respect to each autonomous driving function Fc. Accordingly, the driving assistance device 1 determines a feasible (executable) automation level Lv with respect to each autonomous driving function Fc to thereby perform autonomous driving and conduct a route search based on the determination result. The driving assistance device 1 is an example of "the autonomous driving assistance device" according to the present invention.

It is noted that examples of the autonomous driving function Fc include a LKA (Lane Keeping Assist) function, a self-steering function and an automatic speed adjustment function. The higher the automation level Lv is, the higher the functionality of the function becomes. For example, The level 1 only supports warning and alerting, the level 2 supports a temporal automation of the driving operation in which a predetermined function is in effect only at the time of predetermined conditions being satisfied, and the level 3 supports the full automation of the driving operation regarding the predetermined function.

The server device 2 stores the distribution map DB 21. In response to a request from the driving assistance device 1, the server device 2 extracts from the distribution map DB 21 the map data D1 corresponding to an area where the requesting driving assistance device 1 exists to thereby send the data to the driving assistance device 1.

[Block Configuration]

Figure 2:
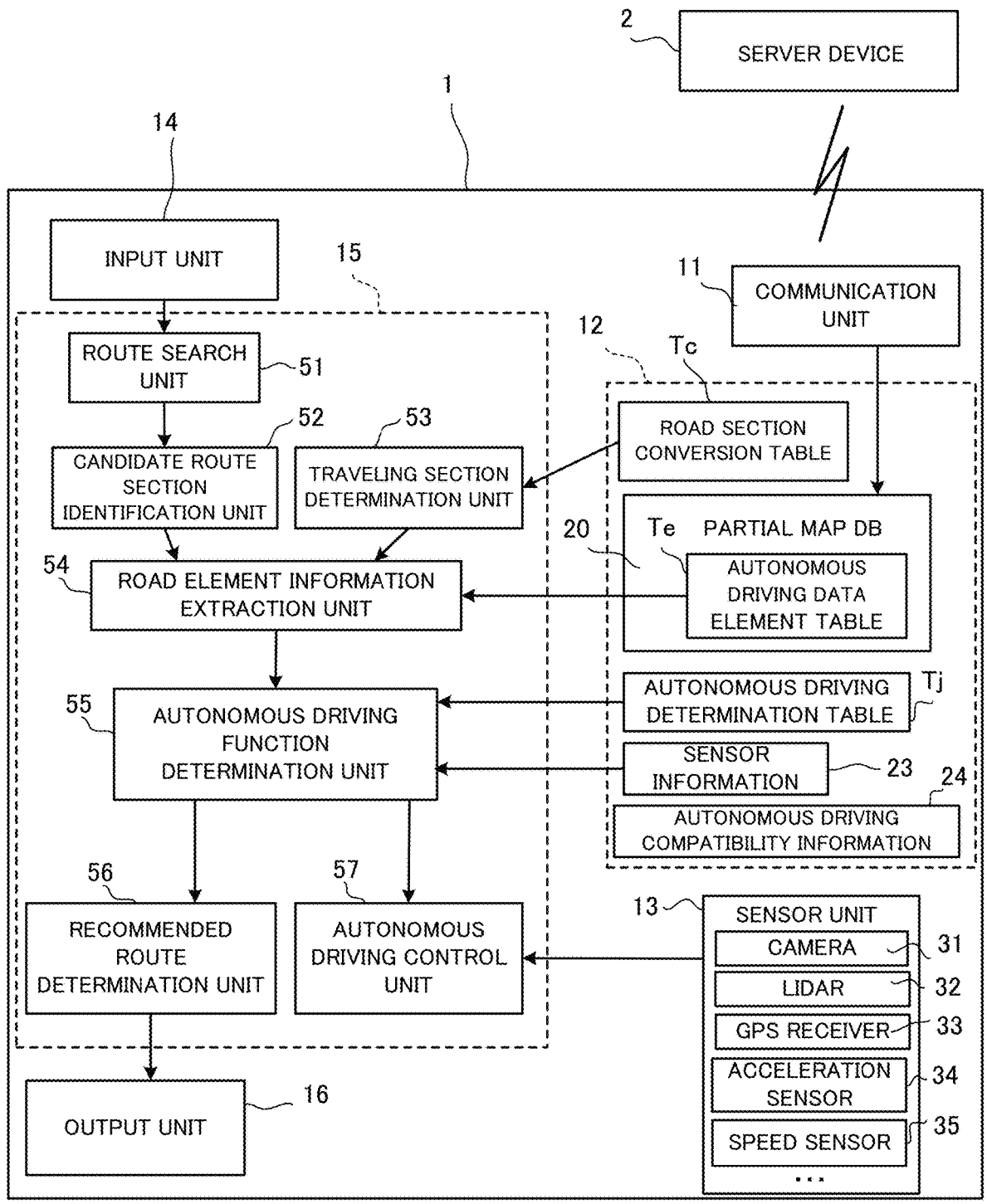
FIG. 2 illustrates a block diagram of a driving assistance device.

FIG. 2 is a block diagram indicating a functional configuration of a driving assistance device 1. As illustrated in FIG. 2, the driving assistance device 1 mainly includes a communication unit 11, a storage unit 12, a sensor unit 13, an input unit 14, a control unit 15 and an output unit 16.

Under the control of the control unit 15, the communication unit 11 acquires the map data D1 from the server device 2 to thereby register the acquired map data D1 on the partial map DB 20. In this case, for example, at the time of approaching or making a prediction of entering such an area that the corresponding map data has not been registered yet on the partial map DB 20, the communication unit 11 sends information indicating the area to the server device 2 to thereby acquire the map data D1 corresponding to the area. Additionally, under the control of the control unit 15, the communication unit 11 acquires weather information from a server device that delivers weather information.

The storage unit 12 stores a program to be executed by the control unit 15 and information necessary for the control unit 15 to execute a predetermined processing. According to the embodiment, the storage unit 12 stores the partial map DB 20 including an autonomous driving data element table Te, sensor information 23, autonomous driving compatibility information 24, a road section conversion table Tc and an autonomous driving determination table Tj.

The sensor information 23 is information indicating a type or a capability with respect to each sensor included in the sensor unit 13. For example, the sensor information 23 is information associating a hardware ID, which is identification information of each sensor included in the sensor unit 13, with type information on the sensor indicated by the hardware ID and capability information on the sensor. The sensor information 23 is an example of the "first information" according to the present invention. The autonomous driving compatibility information 24 is information indicating autonomous driving function(s) Fc and its automation level Lv with which the vehicle equipped with the driving assistance device 1 is compatible. The autonomous driving compatibility information 24 is incorporated into the autonomous driving determination table Tj to be mentioned later. The autonomous driving compatibility information 24 is an example of the "first information" according to the present invention.

The autonomous driving data element table Te is a table on which information (referred to as "road element information Ie") on roads is registered, wherein the autonomous driving data element table Te is necessary to determine the feasible automation level Lv of each autonomous driving function Fc per road section. The above-mentioned road section indicates a unit section into which a road is arbitrarily separated. For example, each road section may correspond to a link which indicates a road on map data. The road section conversion table Tc is a table defining the range, indicated by the latitude and the longitude, corresponding to each road section and each lane. The autonomous driving determination table Tj is a table for determining the feasible automation level Lv of each autonomous driving function Fc on the basis of the sensor information 23 and the road element information Ie which correspond to the target road section of the determination regarding autonomous driving. A description will be given of the data structures of the autonomous driving data element table Te, the road section conversion table Tc and the autonomous driving determination table Tj. The storage unit 12 is an example of the"first acquisition unit" according to the present invention.

The sensor unit 13 is configured of an internal sensors which detect the state of the vehicle and an external sensors for recognizing the peripheral environment of the vehicle. The sensor unit 13 includes a camera 31, a LIDAR (Laser Illuminated Detection and Ranging) (and/or radar) 32, a GPS receiver 33, an acceleration sensor 34 and a speed sensor 35. The camera 31 generates an image with color indicating the external situation. The LIDAR 32 discretely measures distance to an external object and recognizes the position of the object as a three dimensional point group. The GPS receiver 33 generates position information indicating the longitude and the latitude of the present position of the vehicle. The acceleration sensor 34 detects the acceleration of the vehicle. The speed sensor 35 detects the velocity of the vehicle. It is noted that the sensor unit 13 may include a gyroscope sensor and an IMU (Inertial Measurement Unit) for recognizing the posture (e.g., direction) of the vehicle in order to correct data acquired from other sensors. The sensor unit 13 may also includes a sensor which measures a weather condition such as a rain sensor and a fog sensor. In this case, instead of or in addition to acquiring the weather information through the communication unit 11, the control unit 15 generates weather information by determining the present weather condition based on the output of the sensor unit 13. The sensor unit 13 is an example of the "peripheral information acquisition unit" according to the present invention.

Examples of the input unit 14 include a button, a remote controller and an audio input device for user operations. The input unit 14 accepts an input specifying a destination used for a route search and an input specifying the on-state/off-state of autonomous driving. The input unit 14 may also accept information on driving ability of a person riding on the vehicle such as information on the presence/absence of a driver license and information on a driving skill. Such information accepted by the input unit 14 may be stored on the storage unit 12 under the control of the control unit 15. It is noted that, instead of acquiring information on the driving ability based on the user input through the input unit 14, the control unit 15 may certify a driver through an individual certification means and thereafter electrically acquire information of the driving ability associated with the certified driver. In this case, for example, the control unit 15 acquires an ID for specifying the driver through a biometric identification or by reading out the personal IC card, and lets the communication unit 11 send a request signal specifying the ID acquired through the biometric identification or the like to a server device which stores individual information such as information on the history of the driving operation and information on acquisition of a driver license. Then, through the communication unit 11, the control unit 15 receives from the server device information on the driving ability of the driver corresponding to the ID specified by the request signal. In this way, the control unit 15 may electrically acquire information on the driving ability.

The control unit 15 includes a CPU for executing programs and controls the entire driving assistance device 1. According to the embodiment, the control unit 15 performs a processing (referred to as "route search processing") to search for a recommended route in consideration of the feasible automation level Lv of each autonomous driving function Fc in each road section. Additionally, by recognizing the feasible automation level Lv of each autonomous driving function Fc in the road section where the vehicle is traveling, the control unit 15 also performs a processing (referred to as "autonomous driving processing") to perform autonomous driving in accordance with the recognized feasible automation level Lv. The control unit 15 includes a route search unit 51, a candidate route section identification unit 52, a traveling section determination unit 53, a road element information extraction unit 54, an autonomous driving function determination unit 55, a recommended route determination unit 56 and an autonomous driving control unit 57.

When a destination is specified by the input unit 14, the route search unit 51 searches for candidate(s) (referred to as "candidate route(s)") for a guidance route which is a route from the present position to the destination. In this case, for example, the route search unit 51 searches for multiple candidate routes based on criteria other than criteria regarding autonomous driving. The candidate route section identification unit 52 recognize search road section constituting the candidate routes that are searched for by the route search unit 51 to thereafter supply the road element information extraction unit 54 with the identification information of each recognized road section.

On the basis of information (referred to as"present position information") indicating the present position recognized from the output of the sensor unit 13 and the partial map DB 20, the traveling section determination unit 53 recognizes the road section (referred to as "traveling section") and the lane (referred to as "traveling lane") where the vehicle is traveling. Then, the traveling section determination unit 53 supplies the road element information extraction unit 54 with information on the recognized traveling section and traveling lane.

With reference to the autonomous driving data element table Te, the road element information extraction unit 54 extracts the road element information Ie corresponding to each road section of the candidate routes specified by the candidate route section identification unit 52. Similarly, when receiving information specifying the traveling road section and the traveling lane from the traveling section determination unit 53, the road element information extraction unit 54 extracts from the autonomous driving data element table Te the road element information Ie corresponding to the specified traveling road section and the traveling lane. Then, the road element information extraction unit 54 sends information on the extracted road element information Ie to the autonomous driving function determination unit 55. The road element information extraction unit 54 is an example of the "second acquisition unit" according to the present invention, and the road element information Ie is an example of the "second information" according to the present invention.

By referring to the autonomous driving determination table Tj based on the road element information Ie sent from the road element information extraction unit 54 and the sensor type indicated by the sensor information 23, the autonomous driving function determination unit 55 determines a set of the autonomous driving function Fc and the automation level Lv which can be performed in each road section of the candidate routes or in the traveling section. It is noted that the autonomous driving function determination unit 55 may only determine feasible autonomous driving function (s) Fc in each road section of the candidate routes or in the traveling section, or may only determine a feasible automation level Lv of a predetermined autonomous driving function Fc. Depending on the data structures of the autonomous driving determination table Tj and the road element information Ie sent from the road element information extraction unit 54, the autonomous driving function determination unit 55 may determine the set of the autonomous driving function Fc and the automation level Lv which can be performed with respect to each lane (i.e., per lane) corresponding to each road sections of the candidate routes or to the traveling section. The autonomous driving function determination unit 55 may determine the set of the autonomous driving function Fc and the automation level Lv which can be performed in further consideration of weather information indicating weather in each road section of the corresponding candidate route or in the traveling section. In this case, for example, when the weather is predicted to be bad, the autonomous driving function determination unit 55 may determine the automation level Lv to be lower than the automation level Lv determined at the time when the weather is predicted to be fine. This is because the detection accuracy of sensors used for autonomous driving tends to decrease in bad weather and therefore autonomous driving is expected to be more difficult in bad weather than the autonomous driving in fine weather. Additionally, when the road section of the candidate routes or the traveling section is a priority (exclusive) lane for autonomous driving vehicles, the autonomous driving function determination unit 55 may determine the automation level Lv to be higher than the automation level Lv to be determined at the time when the road section of the candidate routes or the traveling section is not a priority (exclusive) lane for autonomous driving vehicles.

Furthermore, when the autonomous driving function determination unit 55 accepts information on a driving ability of a person (or a driver) riding on the vehicle through the input unit 14, the autonomous driving function determination unit 55 may determine, in further consideration of the information on the driving ability, the set of the autonomous driving function Fc and the automation level Lv which can be performed. For example, when the driving ability of the person is low, the autonomous driving function determination unit 55 may restrict the control at the automation level Lv equal to or under third level and permit only the fourth level of the automation level Lv. Then, the autonomous driving function determination unit 55 supplies the recommended route determination unit 56 with the determination result regarding the autonomous driving function Fc and the automation level Lv which can be performed in each road section of the candidate routes. The autonomous driving function determination unit 55 also supplies the autonomous driving control unit 57 with the determination result regarding the feasible automation level Lv with respect to each autonomous driving function Fc in the traveling section. The autonomous driving function determination unit 55 is an example of "the determination unit" according to the present invention.

On the basis of the determination result supplied by the autonomous driving function determination unit 55 regarding the automation levels Lv in each road section of the candidate routes, the recommended route determination unit 56 determines the recommended route to be presented to the user. In this case, for example, the recommended route determination unit 56 may determine, as the recommended route, the candidate route which has the highest average number of the feasible autonomous driving functions Fc of all candidate routes. In another example, the recommended route determination unit 56 may determine, as the recommended route, the candidate route which has the highest average of the automation level Lv with respect to the autonomous driving function Fc specified by the user through the input unit 14. Then, the recommended route determination unit 56 presents the information on the determined recommended route through the output unit 16.

On the basis of the determined route, the autonomous driving control unit 57 performs autonomous driving of the vehicle by using the output information of the sensor unit 13. According to the embodiment, on the basis of the determination result supplied by the autonomous driving function determination unit 55, the autonomous driving control unit 57 determines a feasible autonomous driving function Fc and the corresponding automation level(s) Lv in the present traveling section. Then, for example, the autonomous driving control unit 57 performs the feasible autonomous driving function Fc at the highest level of all feasible automation level(s) Lv.

Examples of the output unit 16 include a display or a speaker, and the output unit 16 outputs information necessary to conduct a route guidance to go to the determined destination. The output unit 16 displays the recommended route specified by the recommended route determination unit 56. At the time of accepting an input of the input unit 14 instructing the start of the guidance along with the recommended route displayed by the output unit 16, the driving assistance device 1 starts autonomous driving based on the recommended route.

[Data Structure]

FIG. 3A indicates an example of the data structure of the road section conversion table Tc. On the road section conversion table Tc indicated by FIG. 3A, there are associated, at least, present position information, road section information on the road section existing at the position indicated by the present position information, and lane information on the lane existing at the position indicated by the present position information. By referring to the road section conversion table Tc indicated in FIG. 3A based on the present position information indicating the present position acquired by use of the sensor unit 13 and the partial map DB 20, the traveling section determination unit 53 recognizes the traveling section and the traveling lane where the vehicle exists.

FIG. 3B indicates an example of the data structure of the autonomous driving data element table Te. On the autonomous driving data element table Te indicated in FIG. 3B, there are associated, at least, road section information, lane information, road element information Ie and road attribute information described later. The road section information is information on the condition of the corresponding road section. Examples of the road section information include height difference on the road section, average bank angle, and road surface condition (whether gravel road or paved road). With reference to the autonomous driving data element table Te indicated in FIG. 3B, the road element information extraction unit 54 extracts the road element information Ie and the road attribute information corresponding to the road section specified by the candidate route section identification unit 52 or the traveling section determination unit 53.

FIG. 3C indicates an example of the data structure of the road element information Ie associated with a road section. The road element information Ie indicated in FIG. 3C includes the item "CATEGORY" which indicates the category of the road information used for determining whether or not autonomous driving can be performed, the item "SUB CATEGORY" which indicates further classifications of each category, the item "PRESENCE/ABSENCE" which indicates the presence or absence of information or an object corresponding to the sub category, and the item "ATTRIBUTE INFORMATION" which indicates detail information on the information or the object corresponding to the sub category. Though, for the purpose of explanation, a part of members on the item "ATTRIBUTE INFORMATION" in FIG. 3C illustrate categories of information to be registered as the attribute information, concrete information corresponding to the illustrated categories is practically registered on the item instead.

According to FIG. 3A, the category "PAINT INFORMATION" corresponds to four sub categories "CENTER LINE", "ROAD SHOULDER LINE", "CHARACTER, FIGURE, ARROW" and "CROSSWALK", and there are a center line and a road shoulder line on the target road section. Then, in this case, information on the color, the line type, and the width are included in the road element information Ie as the attribute information corresponding to the center line and the road shoulder line on the target road section. Similarly, the category "LANE INFORMATION" corresponds to seven sub categories and there is only information on the number of lanes regarding the target road section. In this case, information on the number of lanes is included in the road element information Ie as the attribute information corresponding to the sub category "NUMBER OF LANES". The category "LANDMARK INFORMATION" includes four sub categories and there are a utility pole and a road sign on the target road section. In this case, in the road element information Ie, information on the position, the height, the diameter and the average interval of utility poles is included as the attribute information corresponding to the sub category "UTILITY POLE", and information on the type of the road sign is also included as the attribute information corresponding to the sub category "ROAD SIGN". It is noted that examples of the "object" according to the present invention include "CENTER LINE", "ROAD SHOULDER LINE", "CHARACTER, FIGURE, ARROW", "CROSSWALK", "UTILITY POLE", "GUARDRAIL", "ROAD SIGN" and "TRAFFIC LIGHT" in FIG. 3C.

FIG. 4A illustrates an example of the data structure of the autonomous driving determination table Tj. On the autonomous driving determination table Tj illustrated in FIG. 4A, there are associated each item of "COMPATIBILITY WITH THE MODEL", "REQUIRED SENSOR" and "APPLICABLE CONDITION" with respect to each automation level Lv of the autonomous driving functions Fc. The item "COMPATIBILITY WITH THE MODEL" is an item generated based on the autonomous driving compatibility information 24 and indicates the presence or absence of compatibility of the vehicle of the driving assistance device 1 with each set of the autonomous driving function Fc and the automation level Lv. The item "REQUIRED SENSOR" indicates sensor (s) needed to perform the corresponding set of the autonomous driving function Fc and the automation level Lv. The item "APPLICABLE CONDITION" indicates a condition on the road element information Ie needed to perform the corresponding set of the autonomous driving function Fc and the automation level Lv. In FIG. 4A, for the purpose of explanation, the condition on the road element information Ie is abstractly indicated by alphabets (A to D in this case) in the item "APPLICABLE CONDITION". According to FIG. 4A, as the autonomous driving function Fc, the function $\alpha$ with three stages of the automation level Lv and the function $\beta$ with two stages of the automation level Lv are defined. In this example, the vehicle of the driving assistance device 1 can perform all levels of the function $\alpha$ and the second level of the function $\beta$.

Here, a description will be given of concrete examples in which the autonomous driving function determination unit 55 determines, with reference to the autonomous driving determination table Tj illustrated in FIG. 4A, whether or not each automation level Lv of each autonomous driving function Fc can be performed. FIG. 4B indicates the autonomous driving data element table Te in which the road element information Ie is abstracted as with FIG. 4A. According to FIG. 4B, there are four sub categories A to D regarding the road element information Ie, and the presence or absence (i.e., the item "PRESENCE/ABSENCE" in FIG. 3C) of the correspondence with respect to each sub category is illustrated by "o" or "x".

For example, in case of the first lane in the road section #, the autonomous driving function determination unit 55 recognizes, with reference to the autonomous driving data element table Te, that there is road element information Ie corresponding to the sub categories A, B, D and there is no road element information Ie corresponding to the other sub category C. Thus, the autonomous driving function determination unit 55 determines, with reference to the autonomous driving determination table Tj illustrated in FIG. 4A, that the first level and the second level of the function $\alpha$ and the first level of the function $\beta$ meet the applicable condition. Additionally, the autonomous driving function determination unit 55 recognizes, from the sensor information 23, that the sensor unit 13 includes the camera 31 and the LIDAR 32 and that the vehicle is equipped with sensors needed to perform the function $\alpha$ at the first and second levels and the function $\beta$ at the first level. In contrast, since the vehicle does not correspond to the function $\beta$ the first level, the autonomous driving function determination unit 55 determines that it cannot perform the function $\beta$ at the first level. Thus, the autonomous driving function determination unit 55 determines that the function $\alpha$ at the first level and at the second level is executable on the first lane of the road section #. Accordingly, for example, at the time of traveling on the first lane of the road section #, the autonomous driving control unit 57 performs the function $\alpha$ at the second level which is the higher automation level.

In another example, in case of the second lane of the road section #, the autonomous driving function determination unit 55 recognizes, with reference to the autonomous driving data element table Te, that there is road element information Ie corresponding to the sub categories A and D and there is no road element information Ie corresponding to the other sub categories B and C. Thus, the autonomous driving function determination unit 55 determines, with reference to the autonomous driving determination table Tj illustrated in FIG. 4A, that the first level of the function α and the first level of the function β meet the applicable condition. Since the sensor unit 13 includes the camera 31 and the LIDAR 32, the autonomous driving function determination unit 55 determines that the vehicle is equipped with sensors needed to perform the function α at the first level and the function β at the first level of. In contrast, since the vehicle does not correspond to the first level of the function β, the autonomous driving function determination unit 55 determines that it cannot perform the function β at the first level. Thus, the autonomous driving function determination unit 55 determines that the function α at the first level is executable on the second lane of the road section #. Accordingly, for example, at the time of traveling on the second lane of the road section #, the autonomous driving control unit 57 performs the function α at the first level.

It is noted that at the time of determining whether or not each autonomous driving function can be performed in each road section of the candidate routes, only the road section is specified without any specification of the lane. In this case, for example, the autonomous driving function determination unit 55 may determine the recommended route by regarding any one of lanes available in each road section of a candidate route as the lane to pass through in case of using the candidate route. In another example, the autonomous driving function determination unit 55 may determine the recommended route by regarding the lane having the highest number of feasible autonomous driving functions Fc or the lane having the highest automation level Lv of the feasible autonomous driving function Fc out of all available lanes in the target road section as the lane to pass through in case of using the candidate route.

[Process Flow]

(1) Route Search Processing

Figure 5:
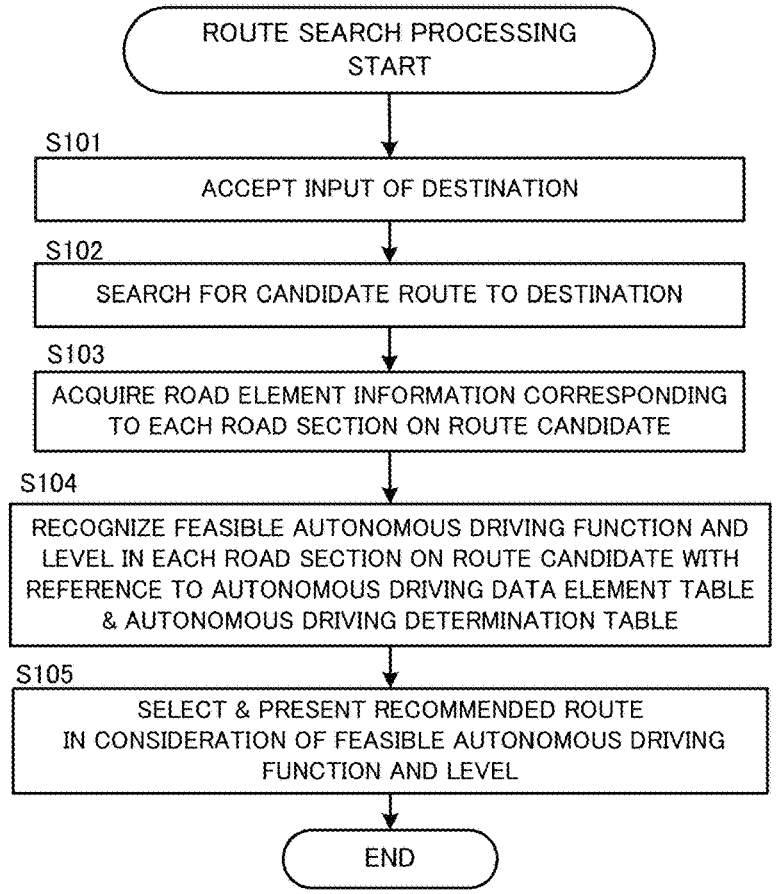
FIG. 5 is a flowchart of the route search processing.

FIG. 5 is a flowchart indicating the procedure of the route search processing executed by the driving assistance device 1.

First, the driving assistance device 1 accepts an input specifying a destination through the input unit 14 (step S101). Then, the route search unit 51 of the driving assistance device 1 searches for candidate routes to go to the specified destination (step S102). In this case, for example, the route search unit 51 searches for predetermined number of candidate routes in consideration of general conditions (e.g., distance and/or tolls) other than the condition on the possibility of autonomous driving. Then, the road element information extraction unit 54 acquires, by extraction from the autonomous driving data element table Te, the road element information Ie corresponding to each road section of the candidate routes that are searched for by the route search unit 51 (step S103).

Next, with reference to the road element information Ie acquired by the road element information extraction unit 54, the sensor information 23 and the autonomous driving determination table Tj stored on the storage unit 12, the autonomous driving function determination unit 55 recognizes a set of the autonomous driving function Fc and the automation level Lv which can be perform on each road section of the candidate routes (step S104).

Then, on the basis of the determination result at step S104, the recommended route determination unit 56 selects a recommended route to be presented to the user from the candidate routes to present the recommended route to the user through the output unit 16 (step S105). In this case, for example, the recommended route determination unit 56 selects, as a recommended route, the candidate route that includes road sections corresponding to the largest number of feasible autonomous driving functions Fc or the highest automation level Lv of the autonomous driving function Fc to be performed. Thereafter, on the basis of user input, the driving assistance device 1 sets the recommended route as a guidance route to the destination and starts autonomous driving based on the guidance route. Thereby, the driving assistance device 1 can guide the user by preferentially using such a route that the burden of the driving operation of the user is low.

(2) Autonomous Driving Processing

Figure 6:
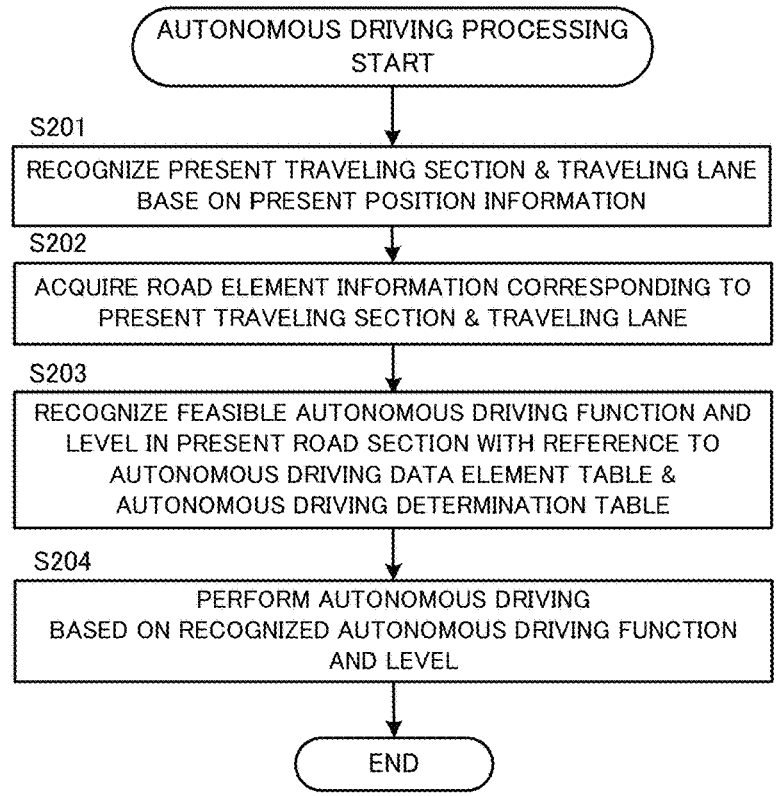
FIG. 6 is a flowchart of the autonomous driving processing.

FIG. 6 is a flowchart indicating the autonomous driving processing executed by the driving assistance device 1.

First, with reference to the autonomous driving data element table Te, the traveling section determination unit 53 recognizes the traveling section and the traveling lane where the vehicle is traveling based on the present position information acquired from the sensor unit 13 and the partial map DB 20 (step S201). Then, the road element information extraction unit 54 acquires the road element information Ie corresponding to the traveling section and the traveling lane specified at step S201 by extraction from the autonomous driving data element table Te (step S202).

Next, with reference to the road element information Ie acquired by the road element information extraction unit 54, the sensor information 23 and the autonomous driving determination table Tj stored on the storage unit 12, the autonomous driving function determination unit 55 recognizes a set of the autonomous driving function Fc and the automation level Lc which can be performed in the present traveling section and the present traveling lane (step S203). Then, the autonomous driving control unit 57 performs autonomous driving by performing the feasible autonomous driving function(s) Fc determined at step S203 at the feasible automation level Lv (step S204). In this case, for example, when there are multiple automation levels Lv of the executable autonomous driving function Fc, the autonomous driving control unit 57 performs the feasible autonomous driving function Fc at the highest level of the multiple automation levels Lv.

As described above, the driving assistance device 1 according to the embodiment performs autonomous driving based on an output from a sensor unit 13 that acquires information on surroundings of a vehicle or information on the state of the vehicle. The driving assistance device 1 stores the autonomous driving determination table Tj based on the autonomous driving compatibility information 24. By referring to the autonomous driving determination table Tj based on the sensor information 23 on the sensor unit 13 and the road element information Ie on a predetermined road section, the driving assistance device 1 determines a set of the autonomous driving function Fc and the automation level Lv that can be performed in the predetermined road section. Thereby, the driving assistance device 1 suitably recognizes the set of the autonomous driving function Fc and the automation level Lv which the vehicle can perform per road section.

[Display Example]

Figure 7:
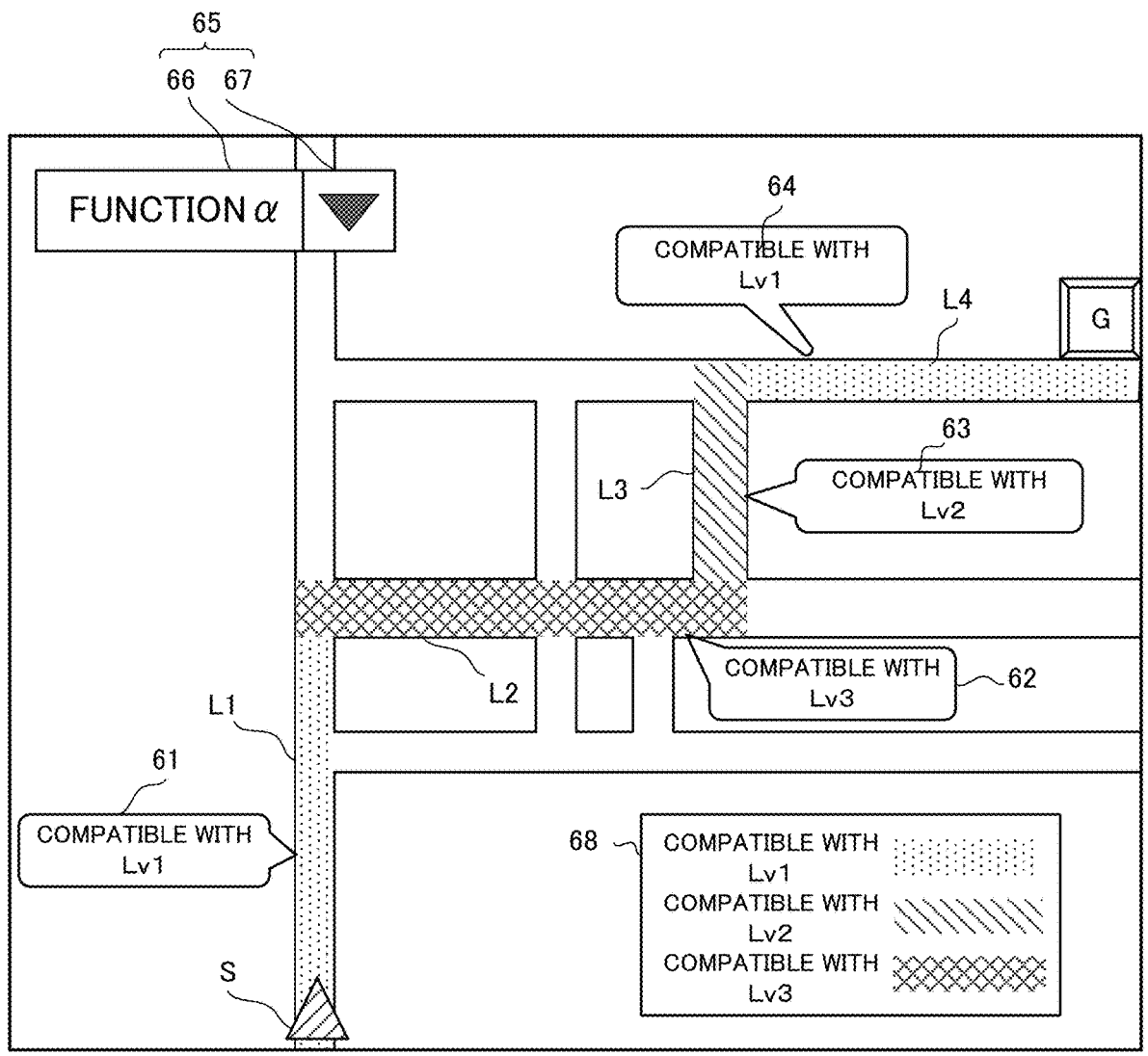
FIG. 7 is a display example of the driving assistance device.

Next, a description will be given of a display example of the driving assistance device 1 according to the embodiment. FIG. 7 is an example of the display by the driving assistance device 1 after the determination of a guidance route.

Regarding the display example illustrated in FIG. 7, the location G indicates the destination accepted at the time of the above-mentioned route search processing at step S101, and the location S indicates the start point (e.g., present position or point specified as the start point) of the route search.

Furthermore, there is illustrated a recommended route determined at step S105 including the roads L1, L2, L3 and L4. FIG. 7 also illustrates the automation level Lv per road at which the vehicle can perform the function α of the autonomous driving function Fc. The control unit 15 displays the roads L1 to L4 constituting the recommended route so that the display mode of each road corresponds to the feasible automation level Lv on the road. According to FIG. 7, the control unit 15 displays the roads L1 to L4 constituting the recommended route so that the higher the automation level Lv the vehicle is compatible with, the darker the control unit 15 turns the color of each road L1 to L4, wherein each feasible automation level Lv on the road L1 and the road L4 corresponds to the first level and the feasible automation level Lv on the road L3 correspond to the second level and feasible the automation level Lv on the road L2 corresponds to the third level. In another example, the control unit 15 may change the color of the roads or the lanes constituting the recommended route depending on the corresponding automation level Lv. Namely, the control unit 15 may clearly illustrate on the map the automation level Lv corresponding to each road or each lane constituting the recommended route so that an observer can visually recognize the corresponding automation level Lv.

Furthermore, according to FIG. 7, the control unit 15 displays the feasible automation level Lv by texts on the balloons 61 to 64 each associated with one of the corresponding roads L1 to L4 constituting the recommended route. Additionally, the control unit 15 provides the field 68, at the bottom right, indicating the correspondence between each automation level Lv and each color (depth). The control unit 15 may display the balloons 61 to 64 and the field 68 at the same time or may display either one of them.

Preferably, the control unit 15 may accept a user operation to switch the target autonomous driving function Fc of displaying the feasible automation level Lv. According to FIG. 7, the control unit 15 displays the select box 65 including the display field 66, which displays the currently set autonomous driving function Fc (function α in FIG. 7), and the button 67 for selecting the autonomous driving function Fc to be set. In this case, for example, if the user selects the button 67 in FIG. 7, the control unit 15 will switch the current autonomous driving function Fc to the selected autonomous driving function Fc. Then, in accordance with the switched autonomous driving function Fc, the control unit 15 switches the display of the automation level Lv corresponding to each of the roads L1 to L4 constituting the recommended route.

[Modifications]

Next, a description will be given of preferred modifications of the embodiment. The following modifications may be applied to the above embodiment in any combination.

(First Modification)

The block configuration is merely one example and the block configuration to which the present invention can be applied is not limited to the block configuration. For example, the server device 2 may determine a set of the executable autonomous driving function Fc and its feasible automation level Lv on behalf of the driving assistance device 1.

In this case, the server device 2 preliminarily stores the autonomous driving data element table Te and the autonomous driving determination table Tj which defines the applicable condition on the road element information Ie with respect to each set of the autonomous driving function Fc and the automation level Lv. The server device 2 receives the sensor information 23 and the autonomous driving compatibility information 24 from the driving assistance device 1. Then, at the time of receiving a route search request specifying a destination from the driving assistance device 1, the server device 2 searches for candidate routes. Then, with respect to each road section of the candidate routes, the server device 2 determines a set of the autonomous driving function Fc and the automation level Lv which can be performed on a road section based on the received sensor information 23, the autonomous driving compatibility information 24, the road element information Ie corresponding to the road, and the autonomous driving determination table Tj. Then, on the basis of the determination result, the server device 2 performs a processing equivalent to the processing executed by the recommended route determination unit 56 in the embodiment to thereby determine the recommended route. Thereafter, the server device 2 sends information on the determined recommended route to the driving assistance device 1 that requests the route search. In this case, the driving assistance device 1 displays the recommended route based on the information sent from the server device 2.

When the vehicle is traveling, the server device 2 receives the position information indicating the present position from the driving assistance device 1 to determine the autonomous driving function Fc and the automation level Lv which the vehicle equipped with the driving assistance device 1 can perform in the road section or on the lane corresponding to the present position. Then, the server device 2 sends the driving assistance device 1 information on the feasible autonomous driving function Fc and its automation level Lv. In this case, the driving assistance device 1 performs the feasible autonomous driving function Fc at the feasible automation level Lv based on the information sent from the server device 2.

It is noted that the server device 2 according to the modification functions as the "autonomous driving assistance device" according to the present invention and a CPU of the server device 2 functions as the "first acquisition unit", the "second acquisition unit", the "determination unit" and a computer which executes the program according to the present invention.

It is noted that a server system including multiple server devices may perform the processing of the server device 2 according to the modification. In this case, each of the server devices performs a predetermined processing by receiving information needed to perform the predetermined processing from other sever devices. In this case, the server system is an example of the "autonomous driving assistance device" according to the present invention.

(Second Modification)

The driving assistance device 1 may acquire and store the autonomous driving data element table Te apart from the partial map DB 20. In this case, for example, the driving assistance device 1 may preliminarily store the autonomous driving data element table Te corresponding to all road sections, or may receive the autonomous driving data element table Te from the server device 2 at a timing other than a timing of acquiring the map data D1 from the server device 2.

(Third Modification)

The autonomous driving determination table Tj illustrated in FIG. 4A defines, at the item "REQUIRED SENSOR", the sensor type needed to perform each automation level Lv of the autonomous driving function Fc. Furthermore, the autonomous driving determination table Tj may define the required capability (performance) of sensors for performing each automation level Lv of the autonomous driving function Fc.

In this case, the autonomous driving determination table Tj includes an item defining information on the required capability with respect to each sensor specified in the item "REQUIRED SENSOR". For example, when there is a camera in the item "REQUIRED SENSOR", information on the necessary capability (i.e., the number of pixels and angle of view) of a camera is recorded in the item for defining the capability information. At the time of determining the possibility of performing an autonomous driving function Fc, the autonomous driving function determination unit 55 of the driving assistance device 1 determines a set of the feasible autonomous driving function Fc and its automation level Lv based on the capability information included in the sensor information 23 on each component of the sensor unit 13.

(Fourth Modification)

The driving assistance device 1 may display each candidate routes by changing the display mode per road section to identify the feasible autonomous driving function Fc per road section of the candidate routes. Furthermore, the driving assistance device 1 may change the display mode per automation level Lv to identify the feasible automation level Lv per road section. In this case, for example, when there are multiple automation levels Lv which can be performed, the driving assistance device 1 determines the display mode in accordance with the highest level of all automation levels Lv. Then, the driving assistance device 1 sets a candidate route selected by the user from the displayed candidate routes as a guidance route and starts to conduct a route guidance.

(Fifth Modification)

The driving assistance device 1 may receive all data of the distribution map DB 21 from the server device 2 and store it instead of receiving the map data D1 which is a part of the distribution map DB 21. In this case, the driving assistance device 1 preliminarily stores the distribution map DB 21 generated at a predetermined time and receives data necessary to update the distribution map DB 21 from the server device 2. In this case, at predetermined time intervals, the driving assistance device 1 sends the server device 2 an inquiry of whether or not it is necessary to update the stored map data and downloads data for updating the distribution map DB 21 from the server device 2 if necessary.

(Sixth Modification)

Instead of referring to the sensor information 23 to recognize each type of the sensors included in the sensor unit 13, the autonomous driving function determination unit 55 may acquire information on each type of sensors included in the sensor unit 13 through data communications with the sensor unit 13.

(Seventh Modification)

According to the embodiment, the autonomous driving compatibility information 24 is incorporated into the autonomous driving determination table Tj as the item "COMPATIBILITY WITH THE MODEL". Instead, the autonomous driving compatibility information 24 may not be incorporated into the autonomous driving determination table Tj. In this case, with reference to the autonomous driving compatibility information 24, the driving assistance device 1 recognizes a set of the autonomous driving function Fc and the automation level Lv to which the vehicle equipped with the driving assistance device 1 corresponds.

The autonomous driving determination table Tj may not include the item "COMPATIBILITY WITH THE MODEL" and the item "REQUIRED SENSOR". In other words, the autonomous driving determination table Tj does not preliminarily include information on any sets of the autonomous driving function Fc and the automation level Lv to which the vehicle does not correspond and any sets of the autonomous driving function Fc and the automation level Lv which requires such a sensor that the sensor unit 13 does not include. In this case, the autonomous driving determination table Tj is generated based on the sensor information 23 and the autonomous driving compatibility information 24 and defines the applicable condition on each set of the feasible autonomous driving function Fc and its automation level Lv only depending on the road element information Ie.

(Eighth Modification)

At step S105 in FIG. 5, the control unit 15 may search for each recommended route per autonomous driving level determined based on a set of the feasible autonomous driving function Fc and its automation level Lv, and lets the user select a recommended route to be set as a guidance route from each recommended route per autonomous driving level.

Figure 8:
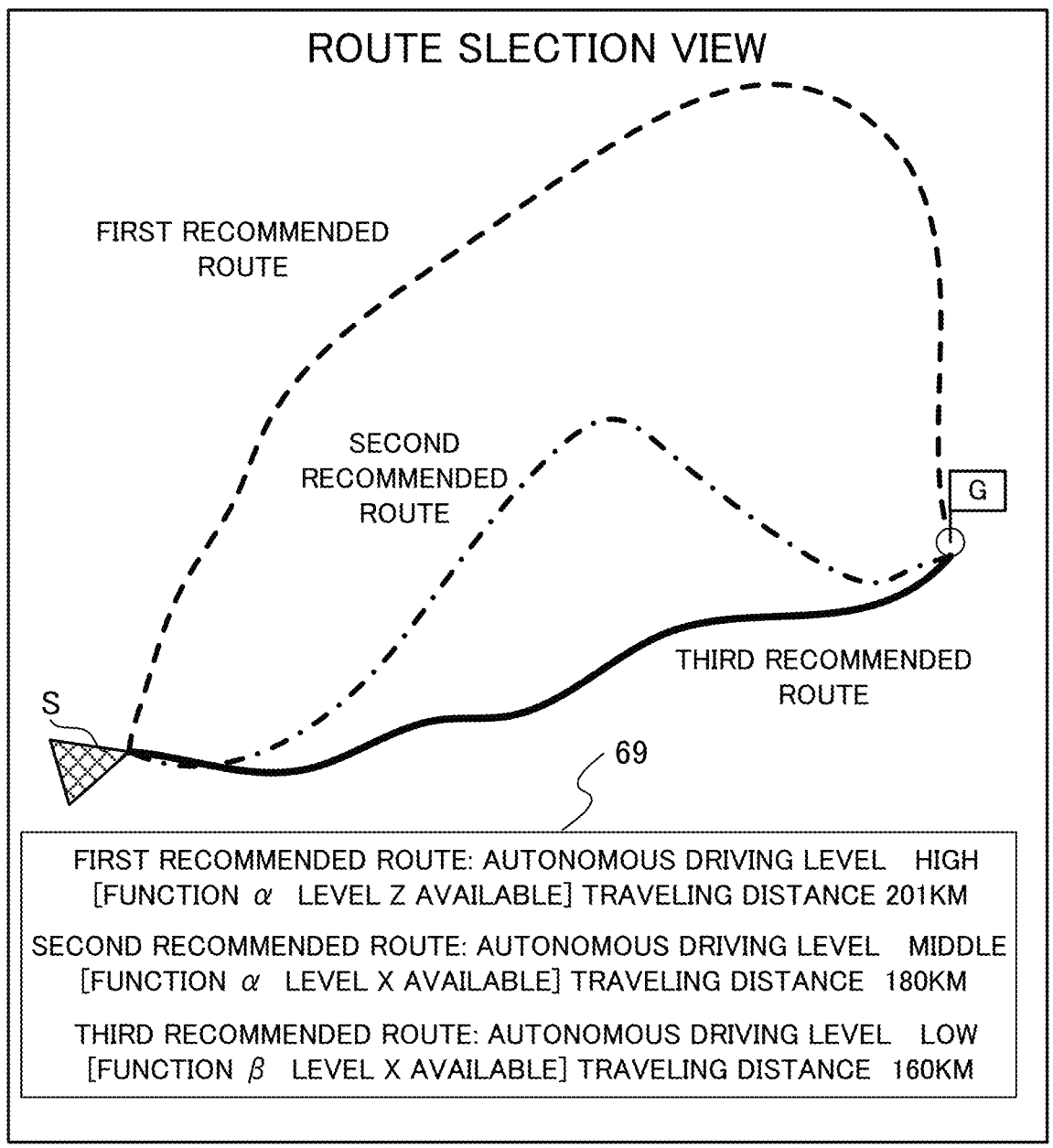
FIG. 8 is a display example of a route selection view.

FIG. 8 illustrates a display example of a route selection view displayed at step S105 in FIG. 5. Regarding the display example illustrated in FIG. 8, as with FIG. 7, the location G indicates the destination accepted at the time of the above-mentioned route search processing at step S101, and the location S indicates the start point (e.g., present position or point specified as the start point) of the route search. According to FIG. 8, the control unit 15 searches for first to third recommended routes each corresponding to autonomous driving levels "HIGH", "MIDDLE" and "LOW". Then, the control unit 15 displays the first to the third recommended routes on the map while displaying on the window 69 the detail explanation including each traveling distance of the first to the third recommended routes. Then, at the time of detecting that any one of the first to the third recommended routes is selected through the operation of the input unit 14 such as a touch panel, the control unit 15 sets the selected recommended route as a guidance route.

Here, according to FIG. 8, the control unit 15 regards the candidate route composed of road sections travelable with the function α of the autonomous driving function Fc at the level "Z" as a candidate route whose autonomous level is "HIGH", and regards the candidate route composed of road sections travelable with the function α of the autonomous driving function Fc at the level "X" (Z>X) as a candidate route whose autonomous level is "MIDDLE". The control unit 15 also regards the candidate route composed of road sections travelable with the function β of the autonomous driving function Fc at the level X as a candidate route whose autonomous level is "LOW". It is noted that the control unit 15 may preliminarily store a table or the like indicating each set of the autonomous driving function Fc and the automation level Lv required to determine each autonomous driving level and determine the autonomous driving level of each candidate routes with reference to the table or the like. Then, the control unit 15 selects, as the first recommended route, the most recommended candidate route from the candidate routes corresponding to the autonomous driving level "HIGH" in consideration of other criteria such as required time and traveling distance. Similarly, the control unit 15 selects the second recommended route from the candidate routes corresponding to the autonomous driving level "MIDLLE" and selects the third recommended route from the candidate routes corresponding to the autonomous driving level "LOW" to thereafter display the selected first to third recommended routes in a selectable state on the screen.

It is noted that, at the time of displaying multiple recommended routes on the route selection view, the control unit 15 may preferentially display a recommended route excellent in a criterion (condition) the user emphasizes. For example, at the time of detecting input or setting to give priority to the autonomous driving level, as the display example illustrated in FIG. 8, the control unit 15 displays, as the first recommended route, the route corresponding to the autonomous driving level "HIGH" and the traveling distance "201 KM" at the top. The control unit 15 also displays the route corresponding to the autonomous driving level "MIDLLE" and the traveling distance "180 KM" as the second recommended route and displays the route corresponding to the autonomous driving level "LOW" and the traveling distance "160 KM" as the third recommended route. In another example, at the time of detecting input or setting to give priority to the traveling distance, the control unit 15 displays the recommended routes in order of short distance of the traveling route. In this case, instead of the display example illustrated in FIG. 8, the control unit 15 displays, as the first recommended route, the route corresponding to the autonomous driving level "LOW" and the traveling distance "160 KM" at the top. The control unit 15 also displays the route corresponding to the autonomous driving level "MIDLLE" and the traveling distance "180 KM" as the second recommended route and displays the route corresponding to the autonomous driving level "HIGH" and the traveling distance "201 KM" as the third recommended route.

(Ninth Modification)

At the time of determining the recommended route at step S105 in FIG. 5, the control unit 15 may search for a route compatible at every position with the set of the autonomous driving function Fc and the automation level Lv which the user specifies.

In this case, for example, at step S101, the control unit 15 accepts an input specifying a desired set of the autonomous driving function Fc and the automation level Lv along with an input specifying the destination. Then, after recognizing a feasible set of the autonomous driving function Fc and the automation level Lv with respect to each road section of each candidate route at step S104, the control unit 15 selects, as the recommended route, such a candidate route that is composed of road sections compatible with the set of the autonomous driving function Fc and the automation level Lv specified through the user input. It is noted that, in such a case that there are multiple candidate routes configured of road sections compatible with the set of the autonomous driving function Fc and the automation level Lv specified through the user input, the control unit 15 displays the route selection view as illustrated in the section (Eight Modification) thereby to let the user select one of the multiple candidate routes as a guidance route.

BRIEF DESCRIPTION OF REFERENCE NUMBERS

1 Driving assistance device
2 Server device
9 Network
11 Communication unit
12 Storage unit
13 Sensor unit
14 Input unit
15 Control unit
16 Output unit

The invention claimed is:

1. An autonomous driving assistance device for assisting in an operation of a vehicle, comprising:
a processor configured by program code stored on a non-transitory data storage in communication with said processor and executable by said processor, said program code, upon execution by said processor, causing the driving assistance device to
display, on a display device in communication with the processor, a route between locations on a map, while displaying a feasible automation level for operating the vehicle on each road section of road sections included in the route, and
control a display mode of each road section of the road sections on the display, in accordance with the feasible automation level corresponding to each one of the road sections.

2. The autonomous driving assistance device according to claim 1,
wherein the feasible automation level comprises one or more autonomous driving functions for operating the vehicle, and
wherein said program code further causes the driving assistance device to display the feasible automation level of each one of the road sections with respect to each autonomous driving function of the one or more autonomous driving functions of the feasible automation level.

3. The autonomous driving assistance device according to claim 1, wherein said program code further causes the driving assistance device to
display the feasible automation level on each road section of the road sections with respect to a first autonomous driving function for operating the vehicle, and then
display the feasible automation level on each of the road sections with respect to a second autonomous driving function for operating the vehicle different from the first autonomous driving function.

4. The autonomous driving assistance device according to claim 1,
wherein the feasible automation level comprises one or more autonomous driving functions for operating the vehicle, and
wherein the one or more autonomous driving functions comprises at least one of a lane keeping assist function, a self-steering function, and an automatic speed adjustment function.

5. The autonomous driving assistance device according to claim 1, wherein said program code further causes the driving assistance device to:
acquire first information regarding a type and a capability of an external sensor, the external sensor configured to acquire surroundings information regarding surroundings of the vehicle, acquire second information regarding the road sections, and determine, based on the first information and the second information, i) one or more feasible autonomous driving functions for operating the vehicle and ii) a feasible automation level correspondent to each of the feasible autonomous driving functions.

6. A method carried out by an autonomous driving assistance device for assisting in an operation of a vehicle, the method comprising:

displaying, on a display device operated by the driving assistance device, a route between locations on a map, while displaying a feasible automation level for operating the vehicle on each road section of road sections included in the route; and controlling a display mode, on the display, of each road section of the road sections on the display, in accordance with the feasible automation level corresponding to each one of the road sections.

7. A non-transitory data storage medium having programming code recorded thereon, said programming code configured to be executed by a processor of an autonomous driving assistance device for assisting in an operation of a vehicle, the programming code configured such that, upon execution by the processor, the autonomous driving assistance device carries out the functions of:

displaying, on a display device operated by the driving assistance device, a route between locations on a map, while displaying a feasible automation level for operating the vehicle on each road section of road sections included in the route; and controlling a display mode, on the display, of each road section of the road sections on the display, in accordance with the feasible automation level corresponding to each one of the road sections.

* * * * *